March 8, 1932.   J. L. DRAKE   1,848,114
PROCESS AND APPARATUS FOR PRODUCING SHEET GLASS
Filed Aug. 30, 1929    2 Sheets-Sheet 1
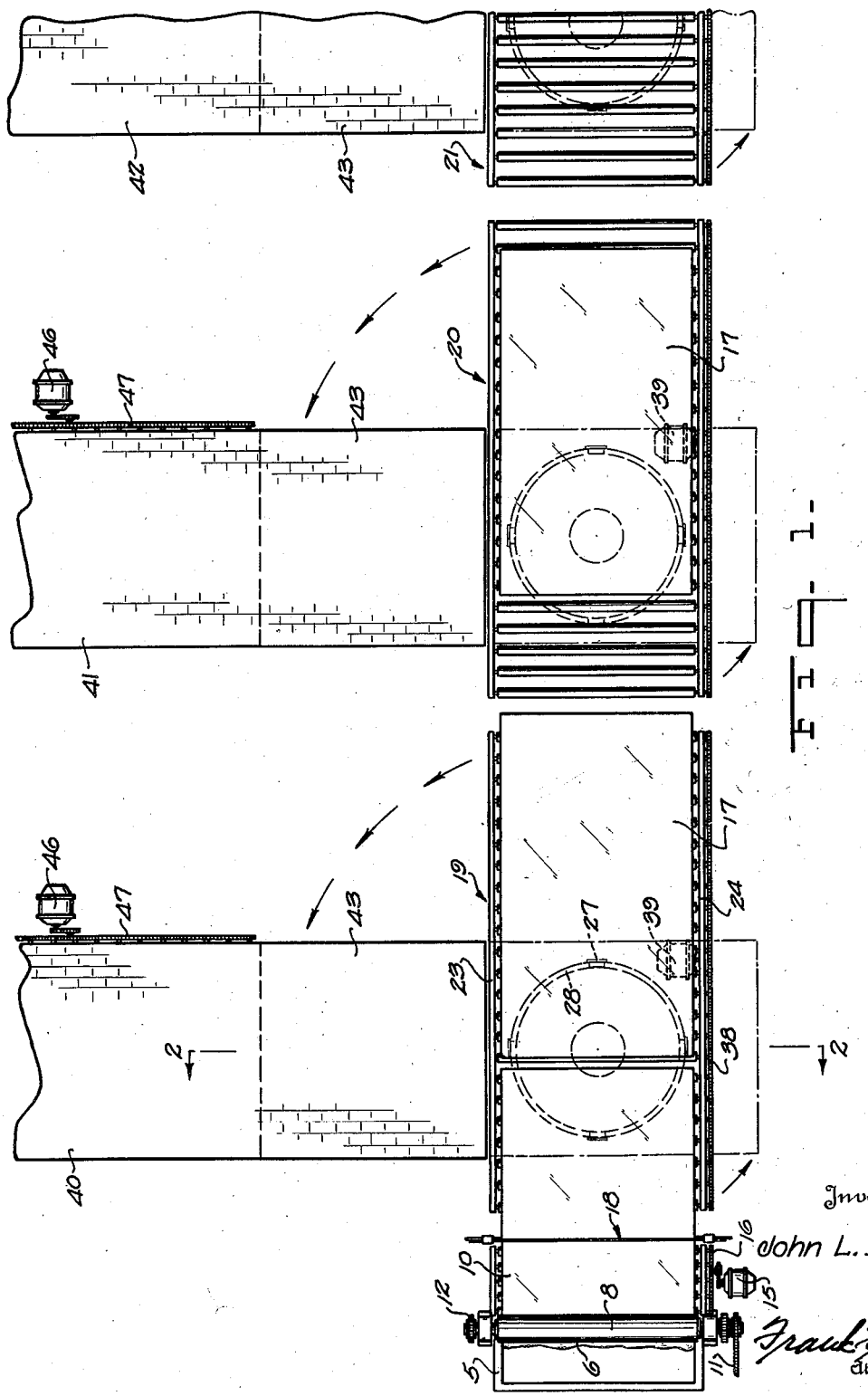
Inventor
John L. Drake.
Frank Frauer
Attorney

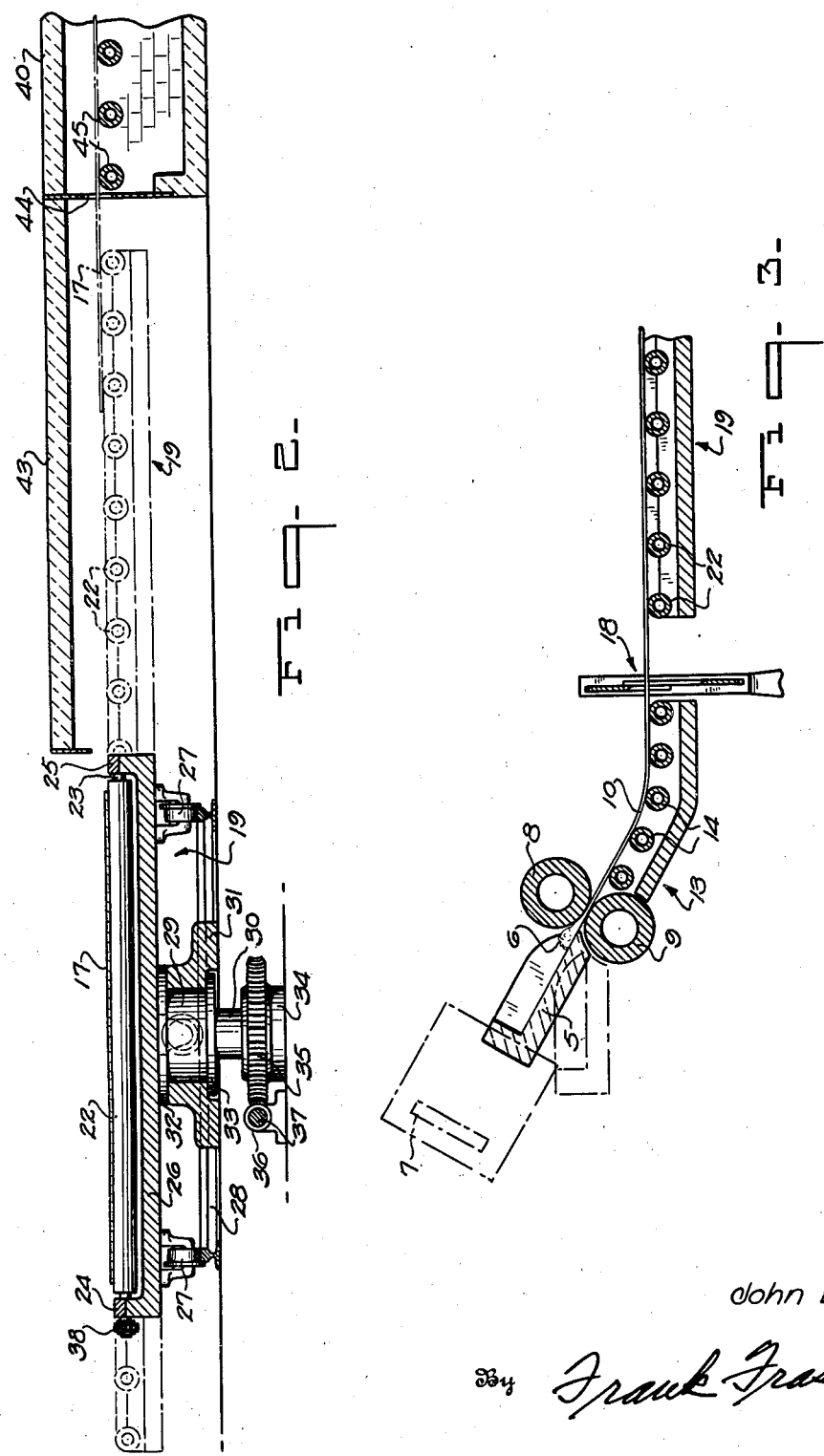

Patented Mar. 8, 1932								1,848,114

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed August 30, 1929. Serial No. 389,581.

The present invention relates to an improved process and apparatus for producing sheet or plate glass.

According to the invention, a plurality of successive sheets of glass are adapted to be formed by an intermittent casting and rolling operation at predetermined intervals from a series of charges or pours of molten glass. The molten glass is preferably melted and refined within suitable receptacles or pots and poured therefrom onto a receiver or support from which it is moved to and passed between a pair of forming rolls which function to reduce the same to a sheet of substantially predetermined and uniform thickness. After the sheet has been formed, it is cut transversely into a plurality of sections and each section fed into a separate annealing leer.

An important object of the invention resides in the provision of a process and apparatus for forming and annealing sheet glass wherein the glass sheet may be formed at a relatively high rate of speed and subsequently transferred into an annealing leer and caused to travel therethrough during the annealing thereof at a speed relatively less than the speed at which it was formed.

Another object of the invention is to provide such a process and apparatus wherein a mass of molten glass is rapidly reduced to sheet form, after which the sheet is divided into a plurality of sections and each section transferred into a separate and individual annealing leer and passed therethrough at a speed less than its speed of formation.

Another object of the invention is to provide such a process and apparatus wherein the sheet sections are received upon conveyor tables and transferred therefrom into separate and individual annealing leers which extend at substantially right angles to the line of formation of the sheet, the sheet sections being delivered endwise into their respective leers and maintained in constant motion during such transfer to prevent sagging thereof.

A further object of the invention involves the provision of novel apparatus for receiving the sheet sections from the forming means and effecting their transfer into the annealing leers in a rapid and convenient manner and without injury thereto.

Other objects and advantages of the invention will become more apparent during the course of the following description when taken in connection with the accompanying drawings.

In the drawings wherein like numerals are employed to designate like parts throughout the same, Fig. 1 is a top plan view of apparatus provided by the present invention, Fig. 2 is a section taken substantially on line 2—2 of Fig. 1, and Fig. 3 is a section of the sheet forming means.

Referring to the drawings, and particularly with reference first to Fig. 3, the numeral 5 designates a receiver or support upon which is deposited a mass or charge of molten glass 6 from a pot or other suitable receptacle 7. As the invention relates particularly to a so-called intermittent process, it is preferred that the molten glass 6 be prepared or at least conditioned in a casting pot of the general type herein shown. Molten glass may be produced in such a pot by arranging the same in a suitable pot furnace, filling it with the desired amount of batch and then subjecting the same to a high temperature to reduce the batch ingredients to molten glass. By proper temperature control and a sufficient length of time, the molten glass may be conditioned so that it will be of excellent quality.

Associated with one end of the receiver 5 is a pair of substantially superimposed sheet forming rolls 8 and 9 arranged with respect to one another to create a sheet forming pass therebetween through which the molten glass 6 is adapted to be moved and reduced to a sheet 10 of substantially predetermined and uniform thickness. The molten glass 6 is preferably deposited upon the receiver 5 while arranged in a substantially horizontal position as indicated by the broken lines, after which the receiver is tilted as shown by the full lines to advance the molten glass to the sheet forming pass created between the forming rolls 8 and 9. One of the forming rolls is adapted to be positively driven such as through a chain drive 11, and the other roll is driven from the positively driven roll through intermeshing gears 12 carried by the roll shafts. Mounted beneath the sheet forming pass and positioned to receive the sheet 10 issuing therefrom, is an inclined runway 13 composed of a plurality of rolls 14 which are arranged to deflect the sheet 10 from its inclined plane into the horizontal plane. The rolls 14 may be driven in unison from a motor or the like 15 through a chain drive 16 operatively connected with the several rolls.

As the glass sheet 10 leaves the runway 13, it is adapted to be cut transversely into a plurality of individual sections 17 by means of any suitable cutting mechanism 18. The forward movement of the sheet sections is then continued until they are received upon the conveyor tables 19, 20 and 21, said tables being arranged in horizontal alignment with one another during the formation of the sheet as illustrated in Fig. 1. In the present instance, three conveyor tables have been illustrated by way of example only since any desired number may be utilized dependent upon the number of sections into which the sheet is to be cut. Thus, the first section 17 cut from the sheet 10 is carried over the tables 19 and 20 onto the conveyor table 21. The next sheet section is carried onto table 20 and the third sheet section is received upon table 19. Therefore, the sheet should be divided into a number of sections equal to the number of conveyor tables employed.

Each conveyor table 19, 20 and 21 is composed of a plurality of horizontally aligned rolls 22 mounted upon shafts 23, journaled at their opposite ends in the side members 24 and 25 carried by the bottom 26. The conveyor table is supported upon a plurality of wheels 27 adapted to run upon a circular track 28. Secured to the bottom of the table centrally thereof is an annular head 29 formed at the upper end of a vertical stub shaft 30 and journaled in a bearing 31. The head 29 is provided at its upper end with a flange 32 resting upon the upper end of bearing 31, while the head is also provided with an annular flange 33 received within a recess in and engaging the bottom of bearing 31. The stub shaft 30 is journaled within a bearing 34 and has keyed thereto a worm gear 35 driven from a worm 36 mounted upon a drive shaft 37 so that upon operation of said shaft, the table will be rotated. The rolls 22 of each conveyor table are adapted to be driven in unison at the same speed, and for this purpose the shaft 23 of each roll 22 may carry a sprocket (not shown) and about the several sprockets may be trained a sprocket chain 38 driven from a variable speed motor 39 carried by the table.

Associated with the conveyor tables 19, 20 and 21 are the annealing leers 40, 41 and 42 respectively, extending at substantially right angles to the line of formation of the glass sheet. Each leer is provided at its intake end with a forwardly projecting overhanging hood 43 and the respective conveyor table is positioned just at the outer end thereof. The leers 40, 41 and 42 may each be provided with an opening or slot 44 at the intake end thereof to allow the passage of the sheet section into the leer, and the said sheet may be carried through the leer upon a plurality of rolls 45 or other suitable conveying mechanism. As here shown, the rolls of each leer are adapted to be driven in unison at the same speed from a motor 46 through a chain drive 47 having operative connections with the rolls.

In carrying the invention into practice, a mass of molten glass 6 is first deposited upon the receiver 5 and then moved to and reduced by the forming rolls 8 and 9 to a sheet of substantially predetermined and uniform thickness. The forming apparatus is preferably operated in such a manner as to quickly reduce the mass of molten glass to sheet form and this may be accomplished by driving the forming rolls at a relatively high rate of speed. By way of example only, the glass sheet can be formed at the rate of approximately sixty feet per minute, although this speed may be increased or decreased as preferred. This rapid reduction of the molten glass to sheet form is desirable both from the standpoint of production and the quality of sheet produced. While it is expedient to reduce the glass rapidly to sheet form, it is not necessary that the sheet be annealed while traveling at this same high rate of speed and in fact such is undesirable for the reason that in this event the annealing leer necessary would have to be of great length. For instance, if the glass were rolled to sheet form at the rate of sixty feet per minute, and should it require sixty minutes to anneal the glass, it will be seen that in the event the sheet was carried through the leer at its speed of formation, the leer would have to be thirty-six hundred feet long. The disadvantages incident to construction, operation and maintenance of a leer of this length are believed to be obvious.

As the glass sheet 10 leaves the runway 13, it is severed by the cutting mechanism 18 into a plurality of sections 17 dependent upon the number of conveying tables and leers employed. During the formation of the sheet, the conveyor tables 19, 20 and 21 are arranged in horizontal alignment with one another and with the forming rolls as illustrated in Fig. 1. The first sheet section 17 cut from the sheet 10 will be carried over the conveyor tables 19 and 20 onto table 21, while the next section will be delivered onto conveyor table 20 and the third and final section onto conveyor 19. As the sheet sections are received upon their respective conveyor tables, the said tables are rotated approximately 90 degrees as indicated by the arrows in Fig. 1 so as to bring the rolls 22 thereof into alignment with the rolls 45 of the corresponding leer, whereupon the sheet sections are delivered from said conveyors into said leers. When the tables are rotated, they are brought under the overhanging hoods 43. Also, during the formation of the sheet, the rolls 22 of conveyor table 19 will be driven at a speed equal to the speed of formation of the sheet, while the rolls of the succeeding conveyors will be driven at progressively increasing speeds in order to effect the necessary separation of the sheet sections.

After the sheet sections have been received upon their respective conveyor tables, the speed of rotation of the rolls 22 is decreased preferably to the speed at which the leer rolls 45 are traveling so that the sheet sections will be transferred into the leers at the annealing speed which is relatively less than the speed of formation of the sheet. Thus, the glass sheets can be formed at a relatively high rate of speed and annealed while traveling at a relatively slower speed. Also, while the sheet sections are transferred into leers extending at substantially right angles to the line of formation of the sheet, they can nevertheless be maintained in constant forward endwise motion so as to minimize sagging of the glass during the transfer thereof into the leer. In other words, the forward movement of the sheet sections is continued while the conveyors are being rotated. In this manner, the annealing operation will be a continuous one or, otherwise stated, the glass will be kept in constant endwise motion during the formation, transfer and annealing thereof. If found desirable, however, the forward movement of the sheet sections can be stopped during the rotation of the tables, or the sheet sections can be moved back and forth upon the tables during the lining up of the tables with the leers.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a plurality of conveyor tables arranged in substantial alignment with one another for receiving successive sheet sections thereupon from a sheet forming mechanism, an annealing leer associated with each conveyor and extending at substantially right angles with respect thereto, and means for rotating the conveyor tables to bring them into alignment with their respective leers.

2. In sheet glass apparatus, a plurality of conveyor tables arranged in substantial alignment with one another, each including a series of rolls for receiving successive sheet sections thereupon from a sheet forming mechanism, an annealing leer associated with each conveyor and extending at substantially right angles with respect thereto, means for rotating the conveyors approximately 90 degrees to bring them into alignment with their respective leers, and means for maintaining the rolls of said conveyors in motion during the rotation thereof.

3. The process of forming sheet glass, consisting in reducing a mass of molten glass to sheet form at a predetermined speed, dividing the sheet into a plurality of sections, carrying the sections forwardly and rotating them approximately 90 degrees while maintaining them in constant endwise motion, and in feeding the sheet sections endwise into individual annealing chambers.

4. In sheet glass apparatus, a plurality of conveyor tables positioned in substantial alignment with one another, each including a series of rolls for receiving successive sheet sections thereupon, from a sheet forming mechanism, an annealing leer associated with each conveyor and extending at substantially right angles with respect thereto, means for rotating the conveyor tables independently of one another to bring them into alignment with their respective leers, and separate means for maintaining the rolls of said conveyors in motion during the rotation thereof.

5. In sheet glass apparatus, a plurality of conveyor tables positioned in substantial alignment with one another, each including a series of rolls for receiving successive sheet sections thereupon, an annealing leer associated with each conveyor and extending at substantially right angles with respect thereto, means for rotating the conveyor tables independently of one another to bring them into alignment with their respective leers, separate means for maintaining the rolls of said conveyors in motion during the rotation thereof, and a forwardly projecting overhanging hood provided at the intake end of each leer and beneath which a portion of the respective conveyor table is adapted to be disposed when said conveyor table is brought into alignment with said leer.

6. The process of forming sheet glass, consisting in reducing a mass of molten glass to sheet form at a predetermined speed, dividing the sheet into a plurality of sections, carrying the sections forwardly and rotating them horizontally, and in feeding the sheet sections endwise into individual annealing chambers.

7. The process of forming sheet glass, consisting in reducing a mass of molten glass to sheet form at a predetermined speed, dividing the sheet into a plurality of sections, carrying the sections forwardly and rotating them horizontally while maintaining them in constant endwise motion, and in feeding the sheet sections endwise into individual annealing chambers.

Signed at Toledo, in the county of Lucas, and State of Ohio, this 28th day of August, 1929.

JOHN L. DRAKE.